(12) United States Patent
Silva et al.

(10) Patent No.: US 7,859,233 B1
(45) Date of Patent: *Dec. 28, 2010

(54) APPARATUS AND METHOD FOR START-UP FOR A SYNCHRONOUS SWITCHING REGULATOR

(75) Inventors: Faruk Jose Nome Silva, Sunnyvale, CA (US); Kwok-Fu Chiu, San Jose, CA (US); Barry James Culpepper, Sunnyvale, CA (US); Michael J. Wurtz, St. Paul, MN (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/387,171

(22) Filed: Mar. 23, 2006

Related U.S. Application Data

(63) Continuation of application No. 10/873,832, filed on Jun. 22, 2004, now Pat. No. 7,045,992.

(51) Int. Cl.
  G05F 1/656 (2006.01)
  G05F 1/652 (2006.01)
(52) U.S. Cl. .................. 323/222; 323/223; 323/224; 323/226
(58) Field of Classification Search ............. 323/222, 323/224, 226, 223
See application file for complete search history.

(56) References Cited

U.S. PATENT DOCUMENTS

| | | | |
|---|---|---|---|
| 5,731,731 A | 3/1998 | Wilcox et al. | |
| 5,912,552 A | 6/1999 | Tateishi | |
| 5,920,475 A * | 7/1999 | Boylan et al. | ............... 363/127 |
| 5,940,287 A * | 8/1999 | Brkovic | ...................... 363/127 |
| 6,144,194 A | 11/2000 | Varga | |
| 6,246,222 B1 | 6/2001 | Nilles et al. | |
| 6,288,529 B1 * | 9/2001 | Takeuchi et al. | ......... 324/76.22 |
| 6,346,798 B1 | 2/2002 | Passoni et al. | |
| 6,476,589 B2 | 11/2002 | Umminger et al. | |
| 6,515,457 B1 | 2/2003 | Maniktala | |
| 6,515,460 B1 | 2/2003 | Farrenkopf | |
| 6,618,274 B2 * | 9/2003 | Boylan et al. | ................. 363/17 |
| 6,674,268 B2 | 1/2004 | Rutter et al. | |
| 6,683,441 B2 | 1/2004 | Schiff et al. | |
| 6,696,821 B2 | 2/2004 | Haraguchi et al. | |
| 6,760,235 B2 * | 7/2004 | Lin et al. | ................. 363/21.06 |
| 6,909,619 B2 | 6/2005 | Saeki et al. | |
| 7,098,641 B2 * | 8/2006 | King | .......................... 323/283 |
| 7,109,688 B1 * | 9/2006 | Chiu et al. | ................... 323/222 |
| 7,109,695 B2 * | 9/2006 | King | .......................... 323/283 |

(Continued)

OTHER PUBLICATIONS

LTC1873 Datasheet: Dual 550kHz Synchronous 2-Phase Switching Regulator Controller with 5-Bit VID, Linear Technology Corporation, 1630 McCarthy Blvd., Milpitas, CA 95035-7417, pp. 1-32, 1999.

(Continued)

*Primary Examiner*—Bao Q Vu
(74) *Attorney, Agent, or Firm*—Frommer Lawrence & Haug LLP; Matthew M. Gaffney

(57) ABSTRACT

A synchronous switching voltage regulator circuit is provided. After the first PWM pulse or at the end of a soft-start, a gradual transition is made from asynchronous rectification to fully synchronous rectification. The gradual transition to synchronous rectification is made by gradually increasing the time that the synchronous switch is enabled to be on.

26 Claims, 7 Drawing Sheets

U.S. PATENT DOCUMENTS

| | | | |
|---|---|---|---|
| 7,180,274 B2 * | 2/2007 | Chen et al. | 323/222 |
| 7,224,590 B2 * | 5/2007 | Lin | 363/21.06 |
| 7,235,955 B2 * | 6/2007 | Solie et al. | 323/222 |
| 7,342,383 B1 | 3/2008 | Song et al. | |
| 2002/0039018 A1 * | 4/2002 | Sanzo et al. | 323/282 |
| 2004/0032242 A1 * | 2/2004 | Corva et al. | 323/284 |
| 2004/0178785 A1 * | 9/2004 | Sutardja et al. | 323/283 |
| 2005/0077884 A1 * | 4/2005 | Krug et al. | 323/282 |
| 2005/0212502 A1 * | 9/2005 | Casey et al. | 323/284 |
| 2005/0219873 A1 * | 10/2005 | Chen et al. | 363/21.16 |
| 2006/0017421 A1 * | 1/2006 | Solie et al. | 323/225 |
| 2006/0055387 A1 * | 3/2006 | Steele | 323/283 |

OTHER PUBLICATIONS

LTC3406 Datasheet: 1.5MHz, 600mA Synchronous Step-Down Regulator in ThinSOT, Linear Technology Corporation, 1630 McCarthy Blvd., Milpitas, CA 95035-7417, pp. 1-16, 2002.

MAX1684/MAX1685 Datasheet: Low-Noise, 14V Input, 1A, PWM Step-Down Converters, Maxim Integrated Products, 120 San Gabriel Drive, Sunnyvale, CA 94086, pp. 1-14, 2001.

Saito, T. et al. (2003) "WTA-Based Interleaved Buck Converters for Low-Voltage High-Current Applications," IEEE, pp. 652-655.

Abu-Qahouq, J. et al. (2004) "Multiphase Voltage-Mode Hysteretic Controlled DC-DC Converter with Novel Current Sharing," IEEE Transactions on Power Electronics, 19(6):1397-1407.

Abu-Qauhouq, J. et al. (2002) "Novel Control Method for Multiphase Low-Voltage High-Current Fast-Transient VRMs," IEEE, pp. 1576-1581.

National Semiconductor Datasheet (2004) "LM27263 2/3/4-Phase Voltage Regulator Controller," pp. 1-24, National Semiconductor Corporation, Santa Clara, California.

* cited by examiner

APPARATUS AND METHOD FOR START-UP FOR A SYNCHRONOUS SWITCHING REGULATOR

CROSS REFERENCE TO RELATED APPLICATIONS

This application is a continuation patent application of U.S. patent application Ser. No. 10/873,832, filed Jun. 22, 2004, which is incorporated by reference herein.

FIELD OF THE INVENTION

The invention is related to switching voltage regulators, and in particular, to an apparatus and method for a gradual transition from asynchronous to fully synchronous rectification.

BACKGROUND OF THE INVENTION

A switching regulator may be configured to provide an output voltage (Vout) in response to an input voltage (Vin). Typically, a switching regulator includes an inductor that is coupled to a switch. In operation, the inductor current is a triangle wave current based on the opening and closing of the switch, and an output capacitor provides Vout from the inductor current. Also, the switch is controlled by a control signal, where the duty cycle of the frequency of the control signal is typically modulated based on negative feedback.

Additionally, a diode-rectified switching regulator employs a diode to rectify the inductor current. A synchronous switching regulator employs a synchronous switch rather than a diode. In a synchronous switching regulator, the inductor current can be positive or negative. Additionally, other topologies may be employed, such as a SEPIC topology or a CUK topology.

BRIEF DESCRIPTION OF THE DRAWINGS

Non-limiting and non-exhaustive embodiments of the present invention are described with reference to the following drawings, in which.

DETAILED DESCRIPTION

Figure 1:
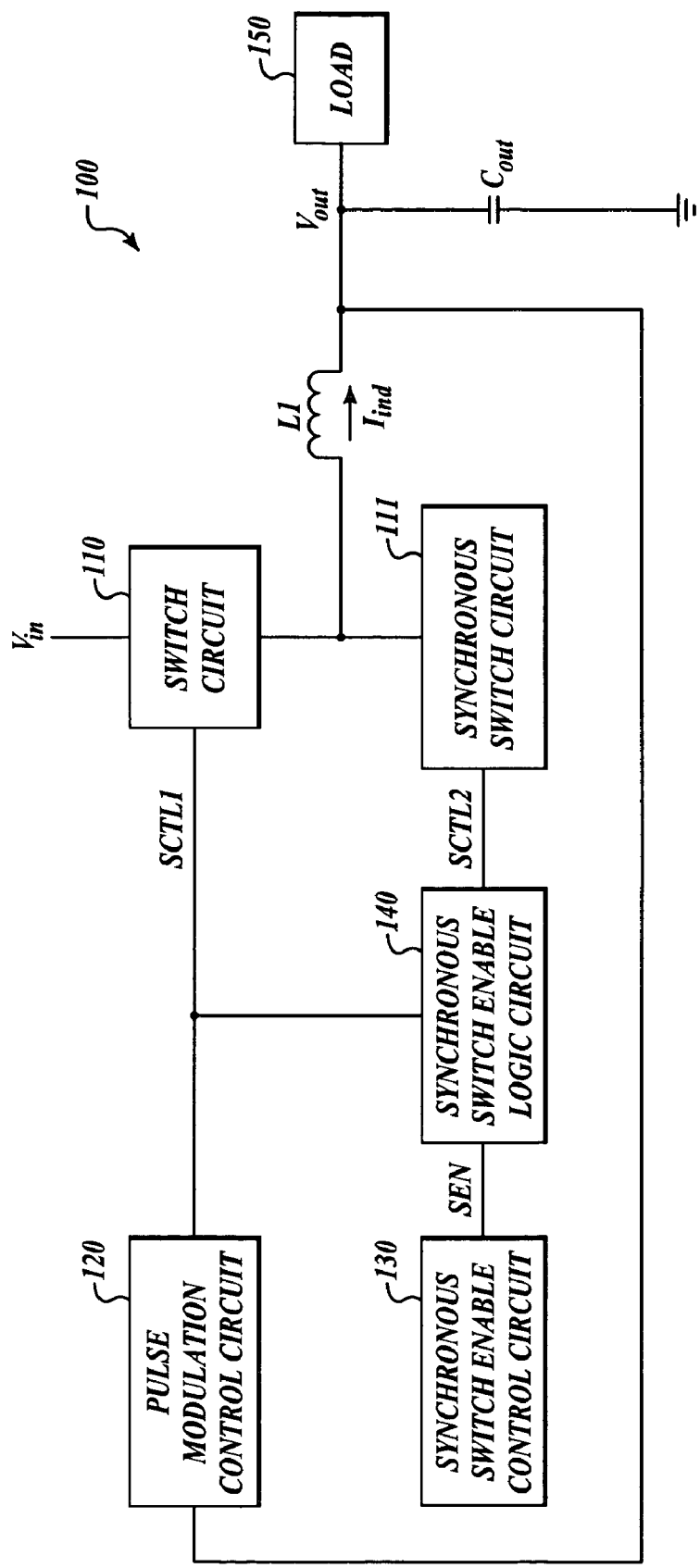
FIG. 1 shows a block diagram of an embodiment of a switching voltage regulator circuit.

Various embodiments of the present invention will be described in detail with reference to the drawings, where like reference numerals represent like parts and assemblies throughout the several views. Reference to various embodiments does not limit to scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context clearly dictates otherwise. The meanings identified below are not intended to limit the terms, but merely provide illustrative examples for the terms. The means of "a," "an," and "the" includes plural reference, and the meaning of "in" includes "in" and "on." The phrase "in one embodiment," as used herein does not necessarily refer to the same embodiment, although it may. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data, or other signal.

Briefly stated, the invention is related to a synchronous switching regulator circuit. After the first PWM pulse or at the end of a soft-start, a gradual transition is made from asynchronous rectification to fully synchronous rectification. The gradual transition to synchronous rectification is made by gradually increasing the time that the synchronous switch is enabled to be on.

FIG. 1 shows a block diagram of an embodiment of switching regulator circuit 100. Switching voltage regulator circuit 100 includes switch circuit 110, synchronous switch control circuit 111, inductor L1, pulse modulation control circuit 120, synchronous switch enable control circuit 130, synchronous switch enable logic circuit 140, output capacitor Cout, and load 150.

Switching regulator circuit 100 is arranged to regulate an output signal. In one embodiment, switching regulator circuit 100 is a voltage regulator that is arranged to rectify output voltage Vout. In another embodiment, switching regulator circuit 100 is a current regulator that is arranged to regulate a current that is based, in part, on output voltage Vout.

Switch circuit 110 is arranged to open and close based, in part, on switch control signal SCTL1. Similarly, synchronous switch circuit 111 is arranged to open and close based, in part, on a synchronous switch control signal SCTL2. Inductor L1 is arranged to provide inductor current Iind to output capacitor Cout such that output voltage Vout is provided. Also, pulse modulation control circuit 120 is arranged to provide signal SCTL1 based, in part, on voltage Vout. In one embodiment, pulse modulation control circuit 120 includes a pulse width modulation (PWM) circuit. In another embodiment, pulse modulation control circuit 120 includes a pulse frequency modulation (PFM) circuit.

In one embodiment, switching regulator circuit 100 employs a soft-start during a soft-start time interval. The soft-start time interval may begin when switching regulator circuit 100 is enabled.

Synchronous switch enable control circuit 130 is arranged to provide signal SEN such that, during a transition time interval, switching regulator circuit 100 gradually transitions from asynchronous rectification of the output signal (e.g. Vout) to (fully) synchronous rectification of the output signal. This may be accomplished by increasing a modulation parameter of signal SEN. During the transition time interval, switching regulator circuit 100 performs partially synchronous rectification of the output signal. In one embodiment, the duty cycle of signal SEN is gradually increased during the transition time interval. In one embodiment, the transition time interval begins after signal SCTL1 first changes to logic high. In another embodiment, the transition time interval begins when the soft-start time interval ends.

Also, synchronous switch enable logic circuit 140 is arranged to provide signal SCTL2 based, in part, on signals SEN and SCTL1. In one embodiment, synchronous switch enable logic circuit 140 is configured to provide signal SCTL2 such that signal SCTL2 corresponds to a logic high if signal SEN corresponds to an active level and signal SCTL1 corresponds to a logic low, and to provide signal SCTL2 such that signal SCTL2 corresponds to a logic low otherwise.

In one embodiment, when the transition time interval begins, synchronous switch circuit 111 begins to turn on for a minimum time every cycle, and then gradually increases the amount of time it turns on during a switching cycle. In another embodiment, the turn-on time gradually increases from a zero turn-on time, rather than starting with a minimum time.

In one embodiment, a transition from fully synchronous rectification of the output signal to asynchronous rectification may be performed. The transition from fully synchronous rectification to asynchronous rectification may be gradual in substantially the same manner as the transition from asynchronous rectification to fully synchronous rectification previously described. During the gradual transition from fully synchronous rectification to asynchronous rectification, a modulation parameter of the signal SEN is gradually decreased.

While fully synchronous rectification is being performed, inductor current Iind is operating in CCM mode. While asynchronous rectification is being performed, inductor current Iind may be operating in DCM. In this case, the transition from asynchronous rectification to fully synchronous rectification causes a transition of current Iind from DCM to CCM. However, if current Iind does not reach zero during asynchronous rectification, then current Iind is in CCM.

Although FIG. 1 illustrates an arrangement of switching voltage regulator circuit 100 in which switching voltage regulator circuit 100 is a synchronous buck regulator, in other embodiments, switching voltage regulator circuit 100 may be arranged as a synchronous flyback regulator, a synchronous boost regulator, or the like. In a synchronous boost regulator arrangement, switch circuit 110 is a bottom-side switch rather than a top-side switch, synchronous switch circuit 111 is a top-side switch rather than a bottom-side switch, and inductor L1 is arranged differently than shown in FIG. 1.

Figure 2:
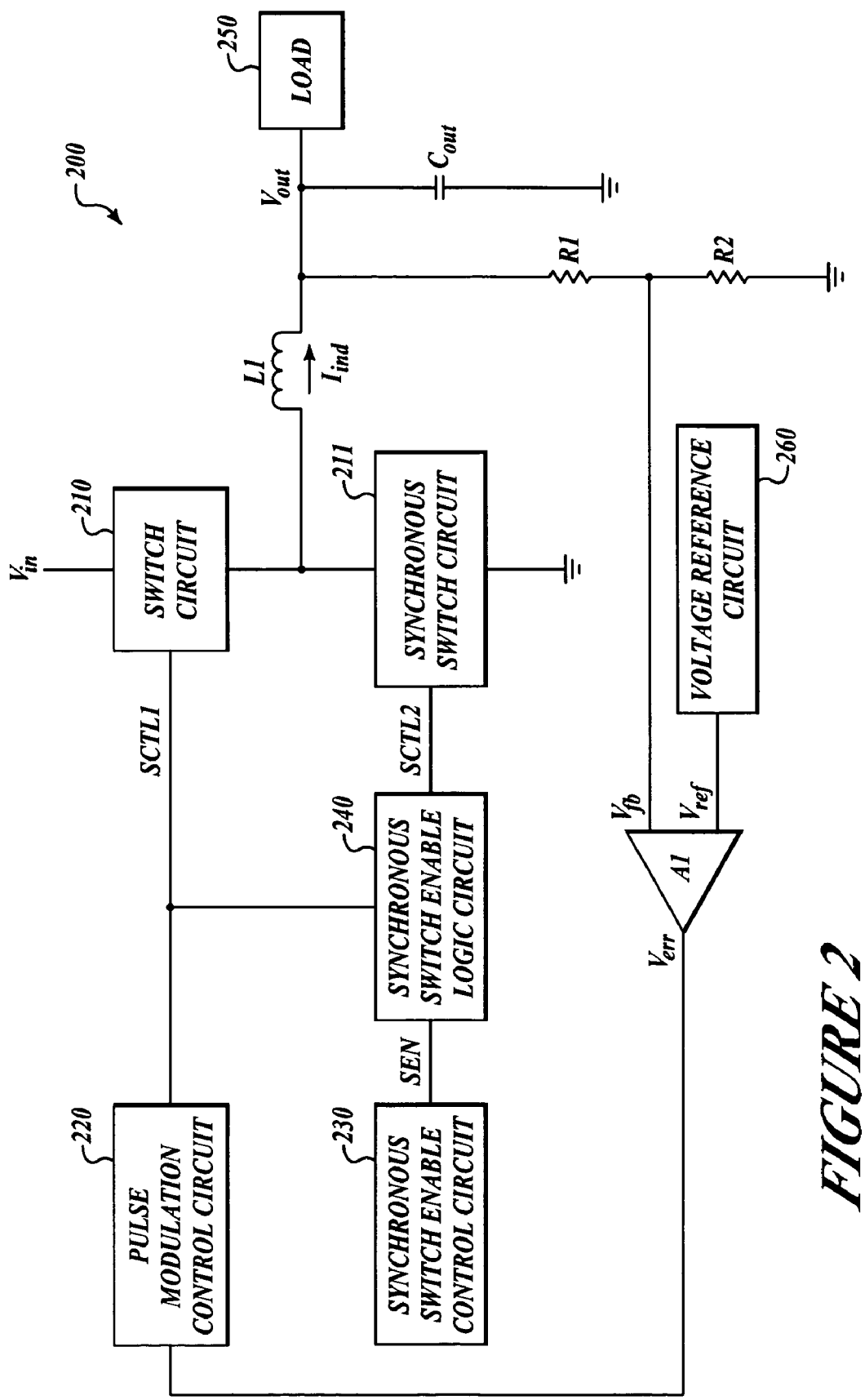
FIG. 2 illustrates a block diagram of an embodiment of the switching voltage regulator circuit of FIG. 1 that includes a voltage divider, an error amplifier, and a voltage reference circuit.

FIG. 2 illustrates a block diagram of an embodiment of switching voltage regulator circuit 200 that includes a voltage divider, an error amplifier, and a voltage reference circuit. Components in switching voltage regulator circuit 200 may operate in a similar manner as similarly-named components in switching regulator circuit 100 of FIG. 1, and may operate in a different manner in some ways. Switching voltage regulator circuit 200 further includes error amplifier A1, voltage reference circuit 260, and resistors R1 and R2. Additionally, although not shown in FIG. 2, other elements such as a capacitor resistor network may be included between error signal Verr and feedback signal Vfb to control the frequency response of switching voltage regulator circuit 200.

Resistors R1 and R2 are arranged as a voltage divider to provide feedback signal Vfb from output voltage Vout. Additionally, voltage reference circuit 260 is arranged to provide signal Vref. In one embodiment, voltage reference 260 is arranged to provide signal Vref a relatively constant reference voltage. In another embodiment, voltage reference 260 is arranged to provide signal Vref as a soft-start reference. In this embodiment, during the soft-start period, signal Vref is arranged to increase signal Vref until a reference value is reached. After the soft-start period, signal Vref is provided at a relatively constant reference voltage.

Also, error amplifier A1 is arranged to provide error signal Verr from signals Vfb and Vref. Pulse modulation circuit 220 is arranged to modulate signal SCTL1 based on signal Verr.

Figure 3:
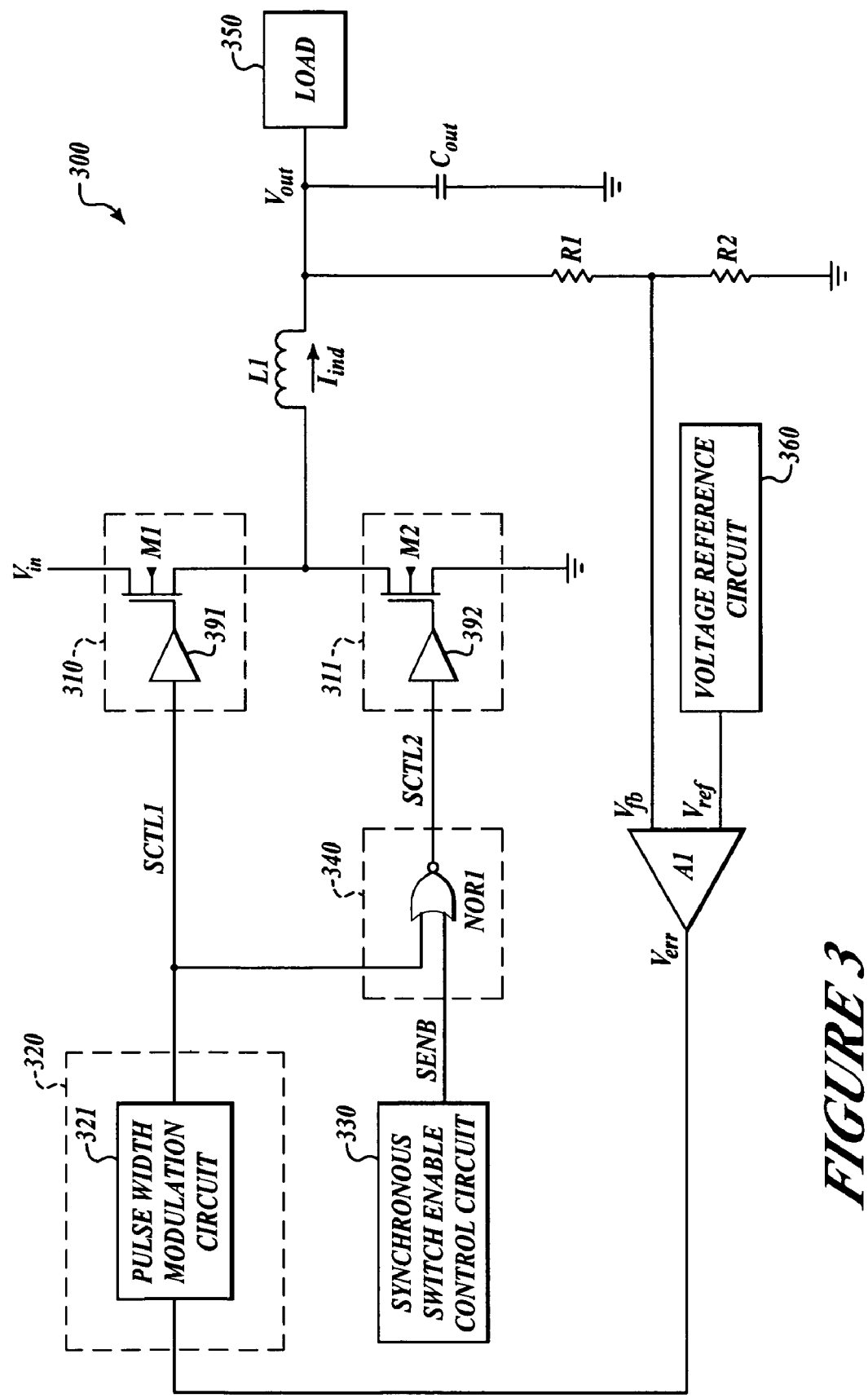
FIG. 3 shows a block diagram of an embodiment of the switching voltage regulator circuit of FIG. 2 in which embodiments of the switch circuit, the synchronous switch circuit, the synchronous switch enable logic circuit, and the pulse modulation control circuit are illustrated.

FIG. 3 shows a block diagram of an embodiment of switching voltage regulator circuit 300, in which embodiments of the switch circuit, the synchronous switch circuit, the synchronous switch enable logic circuit, and the pulse modulation control circuit are illustrated. Components in switching voltage regulator circuit 300 may operate in a similar manner as similarly-named components in switching voltage regulator circuit 200 of FIG. 2, and may operate in a different manner in some ways.

Switch circuit 310 includes transistor M1 and driver circuit 391. Switch transistor 311 includes transistor M2 and driver circuit 392. Synchronous switch enable logic circuit 340 includes NOR gate NOR1. Also, pulse modulation control circuit 320 includes PWM circuit 321.

In FIG. 3, signal SEN is shown as SENB since it is active low in the embodiment shown. Additionally, NOR gate NOR1 is arranged to provide signal SCTL2 from signals SCTL1 and SENB.

Figure 4:
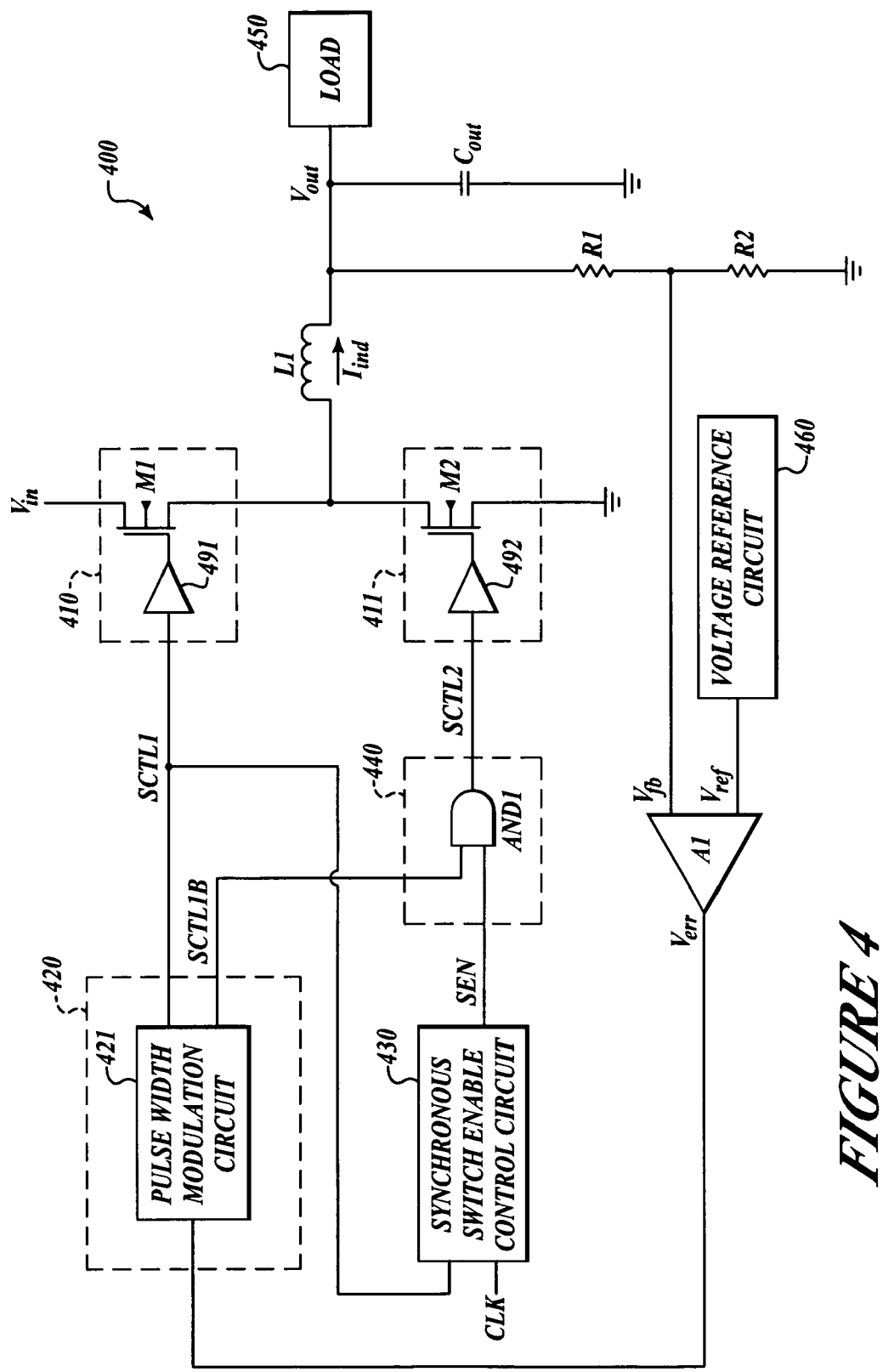
FIG. 4 illustrates a block diagram of an embodiment of the switching regulator circuit of FIG. 2 in which another embodiment of the synchronous switch enable logic circuit is shown.

FIG. 4 illustrates a block diagram of an embodiment of switching voltage regulator circuit 400 in which another embodiment of the synchronous switch enable logic circuit is shown. Components in switching voltage regulator circuit 400 may operate in a similar manner as similarly-named components in switching voltage regulator circuit 300 of FIG. 3 and/or switching voltage regulator circuit 200 of FIG. 2, and may operate in a different manner in some ways. Synchronous switch enable logic circuit 440 includes AND gate AND1.

Also, in voltage regulator circuit 400, signal SEN is active high. Further, synchronous control enable control circuit 430 is arranged to provide signal SEN based, in part, on signals SCTL1 and signal CLK.

PWM circuit 421 is further arranged to provide signal SCTL1B such that signal SCTL1B is an inverse of signal SCTL1. AND gate A1 is arranged to provide signal SCTL2 from signals SCTL1B and SEN.

In one embodiment, load 450 is a pre-biased load, so that load 450 starts up at a non-zero voltage. When switching voltage regulator circuit 400 is enabled, voltage Vout may be regulated at a pre-biased voltage and transition from the pre-biased voltage Vout to a final regulated voltage for voltage Vout.

In one embodiment in which load 450 is a pre-biased load, switching voltage regulator circuit 400 starts up as follows. Switching voltage regulator circuit 400 starts up in asynchronous rectification such that signal SCTL2 corresponds to logic zero. A soft-start is employed such that voltage Vout gradually increases from the pre-biased voltage during asynchronous rectification. When the start-soft ends, the transition time interval begins, in which signal Vout is partially synchronously rectified. After the transition time interval, switching voltage regulator circuit 400 begins normal operation, in which (fully) synchronous rectification is performed.

Preferably, if load 450 is a pre-biased load, the transition to synchronous rectification starts after the voltage starts increasing from the initial pre-biased value. The transition time interval may start at virtually any time after the voltage start increasing from the initial pre-biased value. As described above, in one embodiment, the transition time interval begins at the end of soft-start. The transition from asynchronous rectification of signal Vout to synchronous rectification of signal Vout is performed relatively slowly, (preferably with soft-start type time constants) so that error amplifier A1 can respond seamlessly to the change from asynchronous rectification to synchronous rectification. In one embodiment, the relatively slow transition may be implemented by slowly increasing the width of high pulses in signal SCTL2. After the transition time interval is completed, current Iind is operating in CCM.

For any given duty cycle of signal SCTL1, voltage gain Vout/Vin may be different for DCM than it is for CCM. Also, for any given duty cycle, the voltage gain may be different for asynchronous rectification than is for synchronous rectification, even if the inductor current is in CCM for both the asynchronous and synchronous rectification. By employing a gradual transition from asynchronous rectification to synchronous rectification, a voltage glitch or transient response may be prevented. The transition from asynchronous rectification to synchronous rectification is preferably performed in a sufficiently gradual manner that the closed loop control can compensate for the difference between voltage gain in asynchronous rectification and voltage gain in synchronous rectification.

Figure 5:
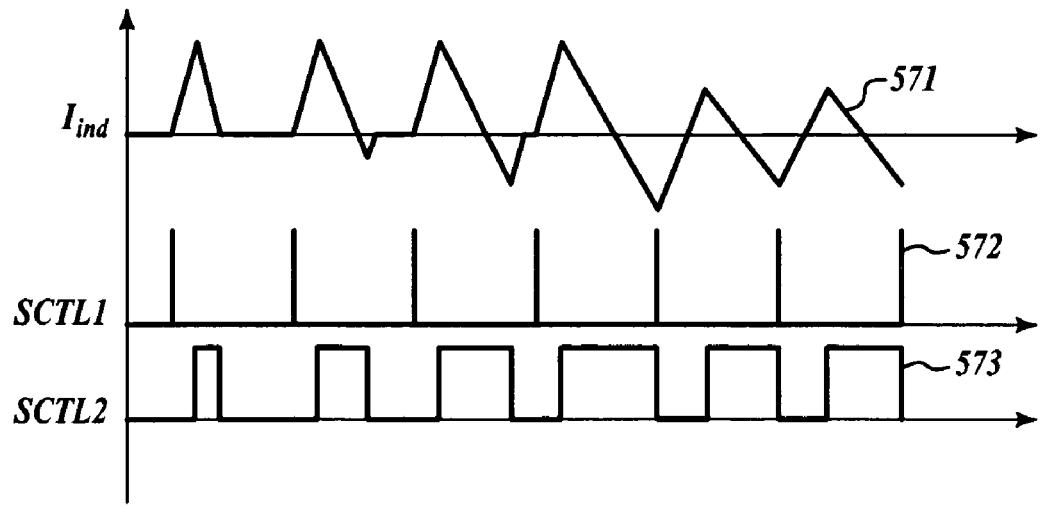
FIG. 5 shows a timing diagram of waveforms of embodiments of current Iind, signal SCTL1, and signal SCTL2 of FIG. 4.

FIG. 5 shows a timing diagram of waveforms 571, 572, and 573 of embodiments of current Iind, signal SCTL1, and signal SCTL2 of FIG. 4, respectively.

For the embodiment illustrated in FIG. 5, inductor current Iind operates in DCM during asynchronous rectification, and operates in CCM during synchronous rectification. During the gradual transition from asynchronous rectification to synchronous rectification, current Iind gradually transition from DCM to CCM.

As shown by waveforms 571, current Iind ramps upward when switch circuit 410 turns on. In the embodiment shown in FIG. 5, as shown by waveform 572, this occurs in response to a pulse in signal SCTL1. Current Iind then ramps downward when switch circuit 410 turns off. Current Iind does not go below zero unless synchronous switch circuit 411 is turned on, where synchronous switch circuit 411 is turned on if signal SCTL2 is high. If signal SCTL2 changes from high to low and current Iind is below zero, current Iind ramp upwards until it reaches zero.

As shown by waveform 573, the pulse width of signal SCTL2 is gradually increased during the transition to fully synchronous rectification, until fully synchronous rectification is reached.

Due to the gradual increase, during the transition from DCM to CCM, for each period of the inductor current, the pulse width of signal SEN is gradually increased during each successive clock period. The duty cycle increases between a first period of current Iind and the period that occurs after the first period of current Iind, and increases further still on the period of current Iind after that. FIG. 5 shows an increase that occurs over a small number of clock cycles for illustrative purposes. However, preferably, as discussed above, the increase in pulse width of signal SCTL2 is sufficiently gradual that the closed loop control can compensate for the different between voltage gain in DCM and voltage gain in CCM. The gradual increase may occur over on the order of 1000 periods of current Iind.

Figure 6:
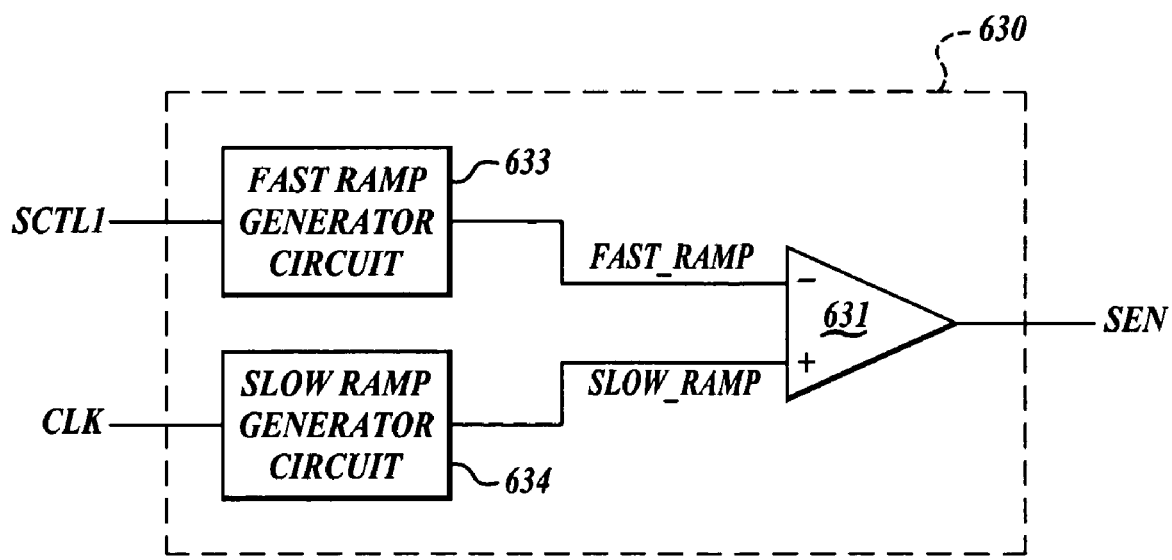
FIG. 6 illustrates a block diagram of an embodiment of the synchronous switch control enable circuit of FIG. 4.

FIG. 6 illustrates a block diagram of an embodiment of synchronous switch control enable circuit 630. Synchronous switch control enable circuit 630 may operate in a substantially similar manner as described for synchronous switch control enable circuit 430 of FIG. 4, and may operate in a different manner in some ways. Synchronous switch control enable circuit 630 includes comparator circuit 631, fast ramp generator circuit 633, and slow ramp generator circuit 634.

Slow ramp generator circuit 634 is arranged to provide ramp signal Slow_Ramp. Fast ramp generator circuit 633 is arranged to provide signal Fast_Ramp signal such that signal Fast_Ramp resets if the first switch control signal corresponds to a low logic level. Also, fast ramp generator circuit 633 is arranged to provide signal Fast_Ramp such that signal Fast_Ramp ramps upwards at a rate that is significantly faster than a rate at which signal Slow_Ramp ramps upward if the first control signal corresponds to a high logic level.

Figure 7:
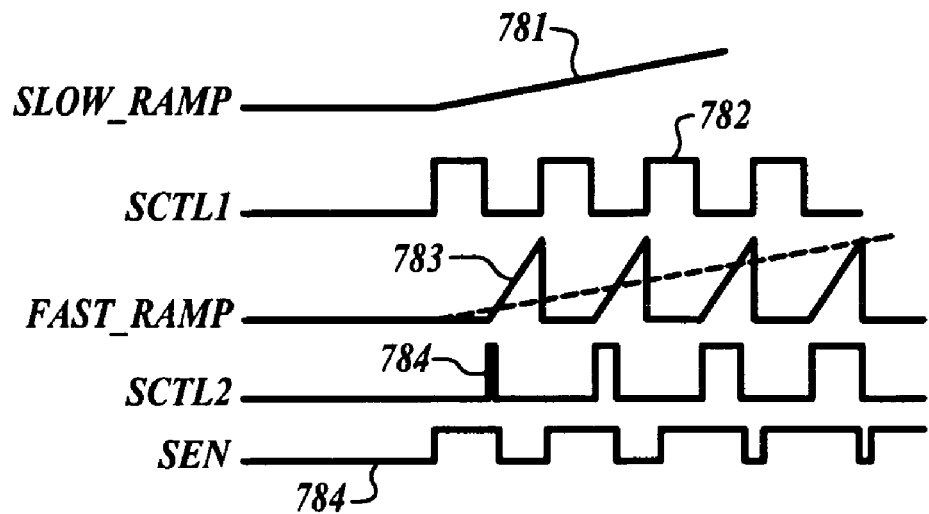
FIG. 7 shows a timing diagram of waveforms of embodiments of signals Slow_Ramp and Fast_Ramp of FIG. 6, and signals SCLT1 and SCLT1 of FIG. 4.

FIG. 7 shows a timing diagram of waveforms of embodiments of signals 781, 783, 782, 783, 784, and 785 of Slow_Ramp and Fast_Ramp, of FIG. 6, signals SCLT1 and SCTL2 of FIG. 4, and signal SEN of FIG. 6, respectively.

Signal Slow_Ramp may increase at much slower rate of speed than is shown for illustrative purposes in FIG. 7. This way, the gradual transition into fully synchronous rectification may occur over a large number of clock cycles so that that the closed loop control can compensate for the difference between voltage gain in asynchronous rectification and the voltage gain in fully synchronous rectification, as explained above.

Figure 8:
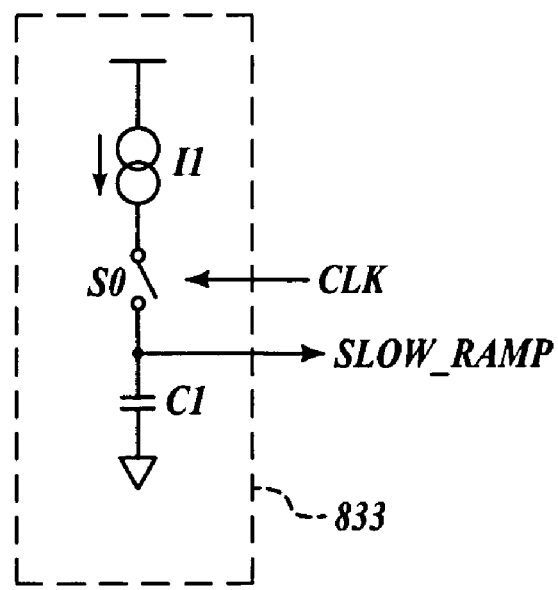
FIG. 8 schematically illustrates an embodiment of the slow ramp generator circuit of FIG. 6.

FIG. 8 schematically illustrates an embodiment of slow ramp generator circuit 833. Slow ramp generator circuit 833 may operate in a substantially similar manner as described for slow ramp generator circuit 633 of FIG. 6, and may operate in a different manner in some ways. Slow ramp generator circuit 833 includes current source I1, capacitor C1, and switch S0. Switch S0 is arranged to open and close responsive to signal CLK.

Figure 9:
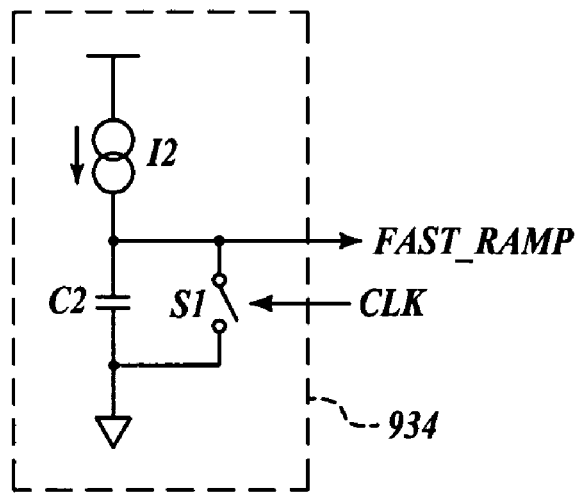
FIG. 9 schematically illustrates an embodiment of the fast ramp generator circuit of FIG. 6.

FIG. 9 schematically illustrates an embodiment of fast ramp generator circuit 934. Fast ramp generator circuit 934 may operate in a substantially similar manner as described for fast ramp generator circuit 634 of FIG. 6, and may operate in a different manner in some ways. Fast ramp generator circuit 934 includes current source I2, capacitor C2, and switch S1. Switch S1 is arranged to open and close responsive to signal SCTL1.

Figure 10:
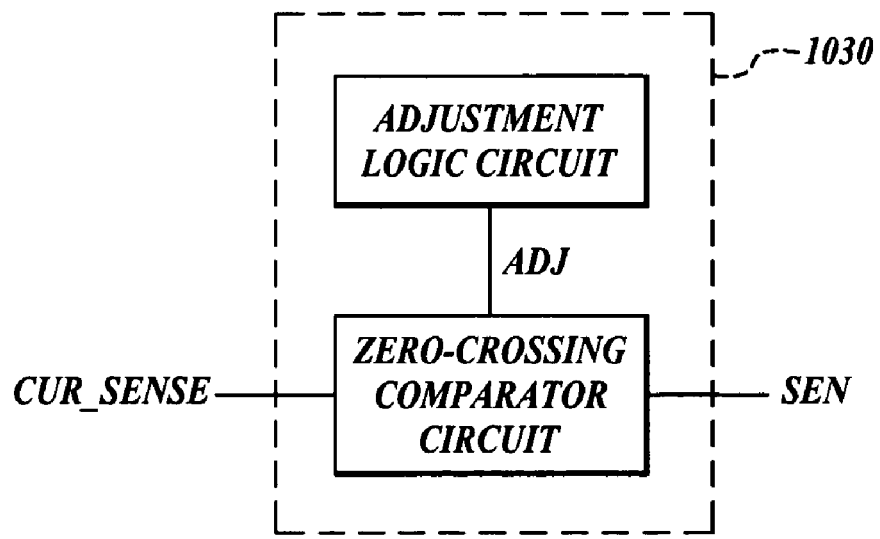
FIG. 10 shows a block diagram of another embodiment of the synchronous switch control enable circuit of FIG. 4, arranged in accordance with aspects of the invention.

FIG. 10 shows a block diagram of an embodiment of synchronous switch control enable circuit 1030. Synchronous switch control enable circuit 1030 may operate in a substantially similar manner as described for synchronous switch control enable circuit 130 of FIG. 1, and may operate in a different manner in some ways. Synchronous switch control enable circuit 1030 includes zero-crossing comparative circuit 1035 and adjustment logic circuit 1036.

Zero-crossing comparator circuit 1036 may be arranged to provide signal SEN from current sense signal Cur_sense. Signal Cur_sense may be substantially proportional to current Iind (e.g. of FIG. 1). Adjustment logic circuit 1036 may be arranged to provide signal ADJ. Also, zero-crossing comparator circuit 1035 may be arranged such that an offset and/or a threshold of zero-crossing comparator circuit 1035 is adjustable responsive to signal ADJ. Further, adjustment logic circuit 1036 may be arranged to provide signal ADJ such that a pulse width of signal SEN is gradually increased during the transition from asynchronous rectification to fully synchronous rectification.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. An apparatus for rectifying an output signal, comprising:
   means for asynchronously rectifying the output signal;
   means for performing partially synchronous rectification on the output signal during a transition time interval, such that the partially synchronous rectification gradually approaches either asynchronous rectification or synchronous rectification during the transition time interval; and
   means for synchronously rectifying the output signal.

2. A method for rectifying an output signal, comprising:
   asynchronously rectifying the output signal;
   performing partially synchronous rectification on the output signal during a transition time interval; and
   synchronously rectifying the output signal, wherein asynchronously rectifying, performing partially synchronous rectification, and synchronously rectifying each include:
   providing a synchronous switch control signal based, in part, on a synchronous switch enable signal and a first switch control signal;
   opening and closing a first switch circuit, based, in part, on the first switch control signal;
   modulating a parameter of the first switch control signal based, in part, on the output signal;
   opening and closing a synchronous switch circuit based, in part, on a synchronous switch control signal; and
   providing the output signal based, in part, on an input signal, the opening and closing of the first switch circuit, and the opening and closing of the synchronous switch circuit;
   asynchronously rectifying further includes:
   providing the synchronous switch enable signal at an inactive logic level; and
   wherein synchronously rectifying further includes:
   providing the synchronous switch enable signal such that the synchronous switch enable signal corresponds to an active logic level when the first switch control signal is inactive.

3. A method for rectifying an output signal, comprising:
   asynchronously rectifying the output signal;
   performing partially synchronous rectification on the output signal during a transition time interval, such that the partially synchronous rectification gradually approaches either asynchronous rectification or synchronous rectification during the transition time interval; and
   synchronously rectifying the output signal.

4. The method of claim 3, wherein performing partially synchronous rectification includes gradually increasing a modulation parameter of a synchronous switch enable signal.

5. A method for rectifying an output signal, comprising:
   asynchronously rectifying the output signal;
   performing partially synchronous rectification on the output signal during a transition time interval; and
   synchronously rectifying the output signal, wherein the transition time interval occurs over at least three consecutive switching cycles; wherein asynchronously rectifying, performing partially synchronous rectification, and synchronously rectifying each include: providing a synchronous switch control signal based, in part, on a synchronous switch enable signal and a first switch control signal; and wherein performing partially synchronous rectification includes gradually decreasing a modulation parameter of the synchronous switch enable signal.

6. A method for rectifying an output signal, comprising:
   asynchronously rectifying the output signal;
   performing partially synchronous rectification on the output signal during a transition time interval; and
   synchronously rectifying the output signal, wherein the transition time interval occurs over at least three consecutive switching cycles; wherein asynchronously rectifying, performing partially synchronous rectification, and synchronous rectifying each include: providing a synchronous switch control signal based, in part, on a synchronous switch enable signal and a first switch control signal; and wherein performing partially synchronous rectification includes gradually increasing a modulation parameter of the synchronous switch enable signal.

7. The method of claim 6, wherein the modulation parameter of the synchronous switch enable signal is a duty cycle of the synchronous switch enable signal.

8. The method of claim 6, wherein gradually increasing the modulation parameter includes:
   providing a first ramp signal that ramps upward;
   providing a second ramp signal such that the second ramp signal resets if the first switch control signal corresponds to a first logic level; and such that, if the first control signal corresponds to a second logic level, the second ramp signal ramps upward at a rate that is at least three times a rate at which the first ramp signal ramps upward;
   comparing the first and ramp signals; and
   providing the synchronous switch enable signal in response to the camparison.

9. The method of claim 6, wherein gradually increasing the modulation parameter includes:
   providing a first ramp signal that ramps;
   providing a second ramp signal such that the second ramp signal resets if the first switch control signal corresponds to a first logic level; and such that, if the first control signal corresponds to a second logic level, the second ramp signal ramps at a rate that is at least three times a rate at which the first ramp signal ramps;
   comparing the first and ramp signals; and
   providing the synchronous switch enable signal in response to the comparison.

10. A synchronous switching regulator circuit, comprising:
    a first switch circuit that is arranged to open and close based on a first switch control signal such that regulation of an output signal is enabled;
    a synchronous switch circuit that is arranged to open and close based on a synchronous switch control signal;
    a pulse modulation control circuit that is arranged to provide the first switch control signal based, in part, on the output signal;
    a synchronous switch enable logic circuit that is arranged to provide the synchronous switch control signal such that:
    if the synchronous switch enable signal corresponds to an active level, and the first switch control signal corresponds to an inactive level:

the synchronous switch control signal corresponds to an active level;
else:
the synchronous switch control signal corresponds to an inactive level; and
a synchronous switch enable control circuit that is arranged to provide the synchronous switch enable signal such that, during a transition time interval that occurs over at least three consecutive switching cycles:
a duty cycle of the synchronous switch enable signal is gradually increased such that partially synchronous rectification is performed, and such that the partially synchronous rectification gradually approaches fully synchronous rectification; or
the duty cycle of the synchronous switch enable signal is gradually decreased such that the partially synchronous rectification is performed, and such that the partially synchronous rectification gradually approaches asynchronous rectification.

11. The synchronous switching regulator circuit of claim 10, wherein the transition time interval occurs over at least 100 switching cycles.

12. The synchronous switching regulator circuit of claim 10, wherein the synchronous switch enable control circuit includes:
a slow ramp generator circuit that is arranged to provide a first ramp signal that ramps upward;
a fast ramp generator circuit that is arranged to provide a second ramp signal such that the second ramp signal resets if the first switch control signal corresponds to a first logic level, and such that the second ramp signal ramps upward at a rate that is at least three times a rate at which the first ramp signal ramps upward if the first control signal corresponds to a second logic level; and
a comparator that is arranged to provide the synchronous switch enable signal in response to a comparison of the first and second ramp signals.

13. The synchronous switching regulator circuit of claim 10, wherein the synchronous switch enable control circuit includes:
a slow ramp generator circuit that is arranged to provide a first ramp signal that ramps;
a fast ramp generator circuit that is arranged to provide a second ramp signal such that the second ramp signal resets if the first switch control signal corresponds to a first logic level, and such that the second ramp signal ramps at a rate that is at least three times a rate at which the first ramp signal ramps if the first control signal corresponds to a second logic level; and
a comparator that is arranged to provide the synchronous switch enable signal in response to a comparison of the first and second ramp signals.

14. The synchronous switching regulator circuit of claim 10, wherein the synchronous switch enable control circuit includes a zero-crossing comparator circuit that is arranged such that at least one of an offset or a threshold of the zero-crossing comparator circuit is gradually increased or gradually decreased during the transition time interval.

15. The synchronous switching regulator of claim 10, wherein the synchronous switch enable control circuit is arranged to provide the synchronous switch enable signal such that, during the transition time interval, at least 10 pulses of the synchronous switch enable control circuit occur, and such that each pulse of the synchronous switch enable signal after the first has a duty cycle greater than the duty cycle of the preceding pulse of the synchronous switch enable signal.

16. The synchronous switching regulator of claim 10, wherein the synchronous switch enable control circuit is arranged to provide the synchronous switch enable signal such that, during the transition time interval, at least 10 pulses of the synchronous switch enable control circuit occur, and such that each pulse of the synchronous switch enable signal after the first has a duty cycle less than the duty cycle of the preceding pulse of the synchronous switch enable signal.

17. The synchronous switching regulator of claim 10, wherein the synchronous switch enable control circuit is arranged to provide the synchronous switch enable signal such that, during the transition time interval, at least 100 pulses of the synchronous switch enable control circuit occur, and such that, in general: each pulse of the synchronous switch enable signal after the first has a duty cycle greater than the duty cycle of the preceding pulse of the synchronous switch enable signal.

18. The synchronous switching regulator of claim 10, wherein the synchronous switch enable control circuit is arranged to provide the synchronous switch enable signal such that, during the transition time interval, at least 100 pulses of the synchronous switch enable control circuit occur, and such that each pulse of the synchronous switch enable signal after the first has a duty cycle less than the duty cycle of the preceding pulse of the synchronous switch enable signal.

19. The synchronous switching regulator circuit of claim 10, wherein the synchronous switch logic circuit is one of an AND gate or a NOR gate.

20. The synchronous switching regulator circuit of claim 10, wherein the pulse modulation circuit is arranged to provide the first switch control signal by performing pulse width modulation on an error signal, wherein the error signal is based, in part, on the output signal.

21. The synchronous switching regulator circuit of claim 10, wherein the transition time interval begins when the first switch control signal first changes to an active level.

22. The synchronous switching regulator circuit of claim 10, further comprising a reference voltage soft-start circuit that is arranged to provide a reference voltage such that, during a refernce voltage soft-start time interval, the reference voltage changes to a reference value, and wherein the transition time interval begins when the reference voltage soft-start time interval ends.

23. The method of claim 3, wherein the transition time interval occurs over at least three consecutive switching cycles.

24. The method of claim 23, wherein asynchronously rectifying, performing partially synchronous rectification, and synchronously rectifying each include:
providing a synchronous switch control signal based, in part, on a synchronous switch enable signal and a first switch control signal.

25. The method of claim 24, wherein the partially synchronous rectification is performed over at least ten pulses of the synchronous switch enable signal, and wherein each pulse of the synchronous switch enable signal after the first has a duty cycle greater than the duty cycle of the preceding pulse of the synchronous switch enable signal.

26. The method of claim 24, wherein the partially synchronous rectification is performed over at least ten pulses of the synchronous switch enable signal, and wherein each pulse of the synchronous switch enable signal after the first has a duty cycle less than the duty cycle of the preceding pulse of the synchronous switch enable signal.

* * * * *

UNITED STATES PATENT AND TRADEMARK OFFICE
CERTIFICATE OF CORRECTION

PATENT NO. : 7,859,233 B1
APPLICATION NO. : 11/387171
DATED : December 28, 2010
INVENTOR(S) : Faruk Jose Nome Silva et al.

It is certified that error appears in the above-identified patent and that said Letters Patent is hereby corrected as shown below:

In column 1, line 28, delete "of" and insert -- or --, therefor. (1st occurrence)

In column 1, line 65, delete "SCTL1" and insert -- SCTL2 --, therefor. (2nd occurrence)

In column 2, line 13, delete "to" and insert -- the --, therefor.

In column 2, line 23, delete "means" and insert -- meaning --, therefor.

In column 5, line 42, delete "synchronous" and insert -- fully synchronous --, therefor.

In column 5, line 44, delete "transition" and insert -- transitions --, therefor.

In column 6, line 4, delete "different" and insert -- difference --, therefor.

In column 6, line 58, delete "comparative" and insert -- comparator --, therefor.

In column 8, line 22, in Claim 6, delete "includes" and insert -- further includes --, therefor.

In column 8, line 39, in Claim 8, delete "camparison." and insert -- comparison. --, therefor.

In column 9, line 2, in Claim 14, delete "level;" and insert -- level, --, therefor.

In column 10, line 40, in Claim 22, delete "refernce" and insert -- reference --, therefor.

In column 10, line 49, in Claim 24, delete "synchronously" and insert -- synchronous --, therefor.

Signed and Sealed this
Fifteenth Day of November, 2011

David J. Kappos
*Director of the United States Patent and Trademark Office*